3,538,753
ULTRASONIC SPECTROSCOPE
Otto R. Gericke, Medfield, Mass., assignor to the United States of America as represented by the Secretary of the Army
Filed Apr. 24, 1968, Ser. No. 723,802
Int. Cl. G01n 29/00
U.S. Cl. 73—67.9                           3 Claims

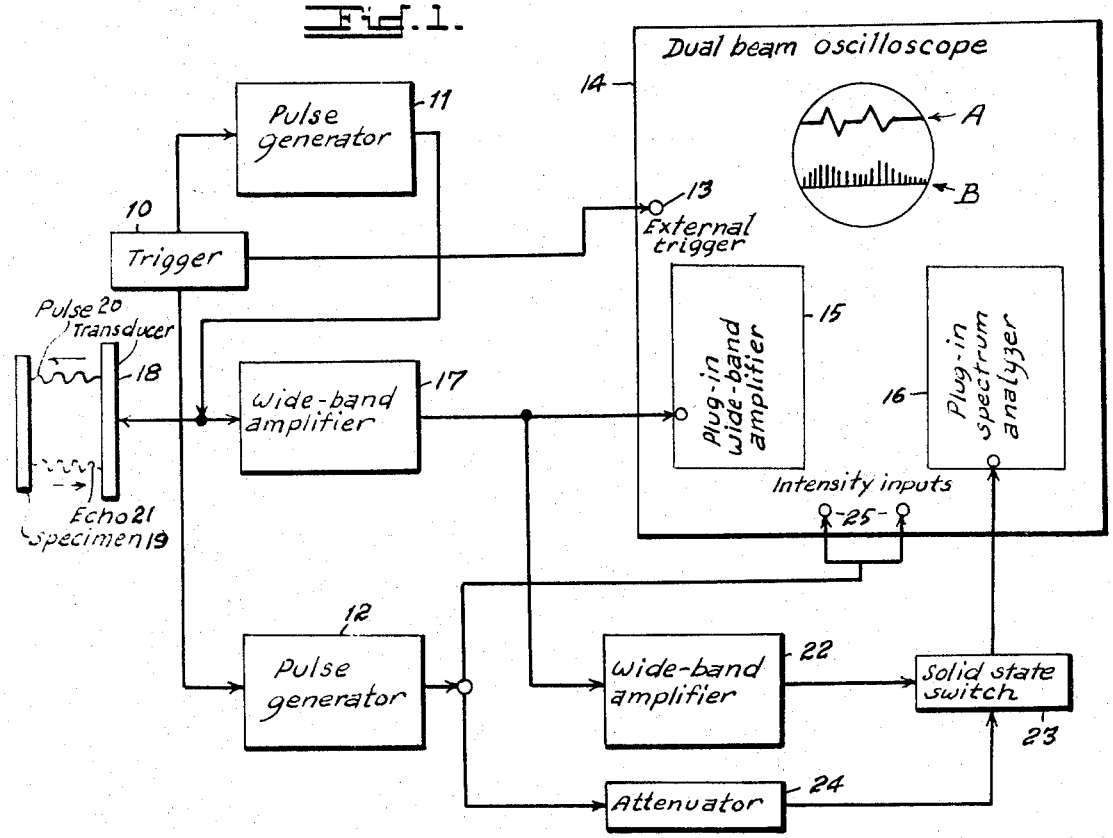
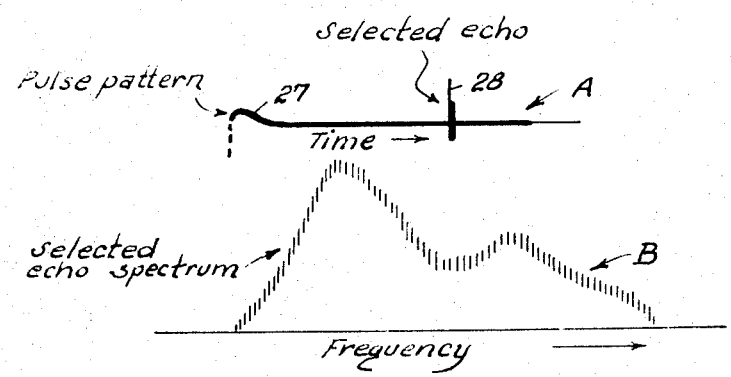

ABSTRACT OF THE DISCLOSURE

An ultrasonic spectroscope utilizing a pulse excited piezoelectric transducer coupled to and energizing a test specimen and which picks up ultrasonic echoes from internal discontinuities or specimen boundaries which are amplified and applied to one beam of a dual-beam oscilloscope whereby a stationary pattern of a selected echo pulse is displayed. The output of piezoelectric transducer is also applied to a second beam of the oscilloscope through amplifier means and a spectrum analyzer resulting a display of spectrum of the selected echo. Both displays are simultaneously presented.

---

The invention described herein may be manufactured, used and licensed by or for the Government of the United States of America for governmental purposes without the payment to me of any royalty thereon.

The invention relates to electronic apparatus for transmission, reception and spectrum analysis of ultrasonic signals.

An object of the invention is an ultrasonic spectroscope for spectrum analysis of ultrasonic signals for the purpose of detecting spectral changes which the signals sometimes undergo while passing through a substance or while being reflected from a reflecting characteristical discontinuity.

Another object of the invention is an ultrasonic spectroscope for detection and display of changes in spectral energy distribution characteristics of internal structure of a substance or geometry of a reflector without destructive effect to the specimen.

A further object of the invention is electronic apparatus for detection and display of spectral energy distribution in a test specimen and for simultaneous display of the pulse pattern and spectrum of a selected echo.

The invention will be more fully understood and its objects and advantages further appreciated by referring now to the following detailed description taken in conjunction with the drawings in which:

FIG. 1 is a block diagram illustrating the ultrasonic spectroscope of the invention; and FIG. 2 is a graphical representation of the dual-beam oscilloscope display showing the pulse pattern and spectrum of a selected echo simultaneously.

Referring to FIG. 1, electronic triggering means 10 providing a variable repetition rate of 1 to 10 kHz. is coupled to a pulse generator 11 designed to generate a rectangular negative voltage pulse of variable amplitude (1–100 volts) with short rise and fall time (~15 nanosec.) and variable duration (15 nanoseconds to 1 microsecond) including a variable time delay circuit of 0 to 10 milliseconds, and to a pulse generator 12 having specifications identical to pulse generator 11. Triggering means 10 is also coupled to the external trigger input 13 of dual-beam oscilloscope 14 which has two independently functioning cathode-ray beams, one provided with a fast time base (5–500 microseconds per cm.) to which electronic trigger 10 is coupled and the other with a slower time base (1 to 10 milliseconds per cm.). The dual-beam oscilloscope 14 has included therein a plug-in vertical deflection amplifier 15 having a deflection sensitivity of 5 millivolts per cm. and a bandwidth of 0.1 to 30 mHz. coupled to the vertical deflection plates associated with the cathode-ray beam provided with the fast time base, and a plug-in spectrum analyzer 16 having an intermediate frequency bandwidth of 100 kHz. ±20%, choice of linear or logarithmic amplitude display, a variable center frequency of 1 to 30 mHz. and a continuously variable dispersion of 1 to 30 mHz. coupled to the vertical deflection plates associated with the cathode-ray beam provided with the slower time base. The output of pulse generator 11 is coupled to wide-band amplifier 17 and piezoelectric transducer 18. The test specimen is indicated by reference numeral 19 and reference numerals 20 and 21 indicate the transmitted pulses of ultrasonic energy and the ultrasonic echoes, respectively.

The output of wide-band amplifier 17 is coupled to the input of plug-in amplifier 15 and to the input of wide-band amplifier 22. Wide-band amplifiers 17 and 22 have a frequency response of 0.1 to 50 mHz. and a gain of 20 db. Solid state switch 23 having a switching time of 10 nanoseconds with small switching transient is connected between input of plug-in spectrum analyzer 16, the output of wide-band amplifier 22 and the output of attenuator 24 providing at least 60 db isolation in the OFF position and having an operating range from D.C. to 100 mc. The switching action is affected by a negative rectangular voltage from attenuator 24 of not more than 10-volt amplitude. The output of pulse generator 12 is coupled to the intensity inputs 25 of dual-beam oscilloscope 14 whereby intensifying signals are applied to both intensity modulation grids of cathode-ray tube, and also to the input of attenuator 24 for the purpose of supplying a gating pulse to solid state switch 23.

Electronic trigger 10 produces a triggering signal which is applied to pulse generators 11 and 12 whereby the two pulse generators are synchronized, and also to external trigger input 13 whereby the time base of the beam producing display A or pulse pattern on the face of the cathode-ray tube is synchronized with pulse generator 11. Piezoelectric transducer 18 which is excited by pulse generator 11, transmits pulses of ultrasonic energy 20 covering a certain range of frequencies, for instance, the range of 3 to 10 mHz. and when coupled to a specimen 19 ultrasonically energizes it and picks up ultrasonic echoes 21 returning from internal discontinuities or specimen boundaries. The signals produced by piezoelectric transducer 18 in response to ultrasonic echoes 21 are amplified by wide-band amplifier 17 whose output signals are coupled into plug-in amplifier 15 and also to plug-in spectrum analyzer 16 of dual-beam oscilloscope 14 through wide-band amplifier 22 and solid state switch 23. The beam of dual-beam oscilloscope 14 that is vertically deflected by the output signals of plug-in, wide-band amplifier 15 has its time base means synchronized with pulse generator 11, producing stationary pattern A (FIG. 2) which shows the transmitted ultrasonic pulse 27 followed by the selected echo or echoes 28 generated in test specimen 19. The echo spectrum B is displayed by means of the beam of dual-beam oscilloscope 14 which is vertically deflected by the signal output of plug-in spectrum analyzer 16. This beam is provided with a much slower horizontal sweep which is proportional to the spectrum analyzer 16 frequency and, hence, displays the spectrum of the signal or signals plotted over a time axis by the beam producing the stationary pattern A. The solid state switch 23 enables selection of a certain echo display by the cathode-ray beam producing pattern A for spectrum analysis. For this purpose, pulse generator 12 which is synchronized with pulse generator 11 supplies a gating pulse through attenuator 24 to solid state switch 23. For the duration of this pulse the signals appearing at the output of amplifier 22 can pass solid state switch 23 and feed into plug-in spectrum analyzer 16. The output of pulse generator 12 also furnishes intensifying signals to both intensity modulation grids of the cathode-ray tube of the dual-beam oscilloscope 14 whereby the presentation on the face of the cathode-ray tube showing the transmitted pulse and the selected echo is intensified and the spectrum of the selected echo, displayed directly below the pulse presentation is enhanced in brightness to set it off from any spurious spectrum which may, for instance, result from the switching transient of solid state switch 23.

Although a specific embodiment of the invention has been illustrated and described, it will be understood that this is but illustrative and that various modifications may be made therein without departing from the spirit of the invention and the scope of the claims.

I claim:

1. An ultrasonic spectroscope providing analysis of ultrasonic signals for the purpose of detecting spectral changes which the signals sometimes undergo while passing through a substance or while being reflected from an acoustical discontinuity comprising in combination, a first ultrasonic generator having the output thereof coupled to a piezoelectric transducer and to the input of a first wide-band amplifier whereby the piezoelectric transducer ultrasonically energizes a test specimen coupled thereto and detects the ultrasonic echoes returning from the specimen, means coupling the piezoelectric transducer to input of the first wide-band amplifier, said first wide-band amplifier amplifying the ultrasonic pulse generated by the first ultrasonic generator and the pulses generated by the piezoelectric transducer in response to the detected ultrasonic echoes, a dual-beam oscilloscope provided with a plug-in amplifier having the output thereof coupled to the vertical deflection plates associated with one of said beams and a plug-in spectrum analyzer having the output thereof coupled to vertical deflection plates associated with the other of said beams, means coupling the output of the first wide-band amplifier to the plug-in amplifier whereby the amplified ultrasonic pulses generated by the first ultrasonic pulse generator and the pulses generated in response to ultrasonic echoes are applied to the vertical deflection plates associated with the said one of said beams presenting an oscilloscope pulse pattern display thereof, a second wide-band amplifier coupling the output of the first wide-band amplifier to the input of the plug-in spectrum analyzer through switching means whereby the pulses in response to said ultrasnoic echoes are applied to the vertical deflection plates associated with said other of said beams presenting an oscilloscope spectrum display thereof, and means for enabling the selection of a certain echo pulse pattern of said ultrasonic echoes for spectrum analysis comprising, a solid state switch provided with an output means and a first and second input means, said output means coupled to the input of the plug-in spectrum analyzer, said first input means coupled to the output of the second wide-band amplifier, a second ultrasonic pulse generator, electronic triggering means connected to said first and second ultrasonic generators whereby said generators are synchronized, the output of said second ultrasonic pulse generator connected to said second input means whereby a gating pulse is applied to the solid state switch enabling the selection of a certain ultrasonic echo pulse pattern display for spectrum analysis.

2. An ultrasonic spectroscope providing analysis of ultrasonic signals for the purpose of detecting spectral changes which the signals sometimes undergo while passing through a substance or while being reflected from an acoustical discontinuity comprising in combination, a first ultrasonic generator having the output thereof coupled to a piezoelectric transducer and to the input of a first wide-band amplifier whereby the piezoelectric transducer ultrasonically energizes a test specimen coupled thereto and detects the ultrasonic echoes returning from the specimen, means coupling the piezoelectric transducer to input of the first wide-band amplifier, said first wide-band amplifier amplifying the ultrasonic pulses generated by the first ultrasonic generator and the pulses generated by the piezoelectric transducer in response to the detected ultrasonic echoes, a dual-beam oscilloscope provided with a plug-in amplifier having the output thereof coupled to the vertical deflection plates associated with one of said beams and a plug-in spectrum analyzer having the output thereof coupled to vertical deflection plates associated with the other of said beams, means coupling the output of the first wide-band amplifier to the plug-in amplifier whereby the amplified ultrasonic pulses generated by the first ultrasonic pulses generator and the pulses generated in response to ultrasonic echoes are applied to the vertical deflection plates associated with the said one of said beams presenting an oscilloscope pulse pattern display thereof, a second wide-band amplifier coupling the output of the first wide-band amplifier to the input of the plug-in spectrum analyzer through switching means whereby the pulses in response to said ultrasonic echoes are applied to the vertical deflection plates associated with said other of said beams presenting an oscilloscope spectrum display thereof, means for enabling the selection of a certain echo pulse pattern of said ultrasonic echoes for spectrum analysis comprising, a solid state switch provided with an output means and a first and second input means, said output means coupled to the input of the plug-in spectrum analyzer, said first input means coupled to the output of the second wide-band amplifier, a second ultrasonic pulse generator, electronic triggering means connected to said first and second ultrasonic generators whereby said generators are synchronized, the output of said second ultrasonic pulse generator connected to said second input means whereby a gating pulse is applied to the solid state switch enabling the selection of a certain ultrasonic echo pulse pattern display for spectrum analysis, and means for producing a stationary pattern display of the ultrasonic pulses transmitted to said specimen and the ultrasonic pulse echoes reflected by said specimen comprising, said electronic triggering means connected to external trigger input means of said dual-beam oscilloscope whereby the time base associated with the said one of said beams is synchronized with the first ultrasonic generator thereby producing a stationary pulse pattern display of ultrasonic pulses energizing said specimen and the ultrasonic pulses reflected by said specimen.

3. An ultrasonic spectroscope providing analysis of ultrasonic signals for the purpose of detecting spectral changes which the signals sometimes undergo while passing through a substance or while being reflected from an acoustical discontinuity comprising in combination, a first ultrasonic generator having the output thereof coupled to a piezoelectric transducer and to the input of a first wide-band amplifier whereby the piezoelectric transducer ultrasonically energizes a test specimen coupled thereto and detects the ultrasonic echoes returning from the specimen, means coupling the piezoelectric transducer to input of the first wide-band amplifier, said first wide-band amplifier amplifying the ultrasonic pulses generated by the first ultrasonic generator and the pulses generated by the piezoelectric transducer in response to the detected ultrasonic echoes, a dual-beam oscilloscope provided with a plug-in amplifier having the output thereof coupled to the vertical deflection plates associated with one of said beams and a plug-in spectrum analyzer having the output thereof coupled to vertical deflection plates associated with the other of said beams, means coupling the output of the first wide-band amplifier to the plug-in amplifier whereby the amplified ultrasonic pulses generated by the first ultrasonic pulse generator and the pulses generated in response to ultrasonic echoes are applied to the vertical deflection plates associated with the said one of said beams presenting an oscilloscope pulse pattern display thereof, a second wide-band amplifier coupling the output of the first wide-band amplifier to the input of the plug-in spectrum analyzer through switching means whereby the pulses in response to said ultrasonic echoes are applied to the vertical deflection plates associated with said other of said beams presenting an oscilloscope spectrum display thereof, means for enabling the selection of a certain echo pulse pattern of said ultrasonic echoes for spectrum analysis comprising, a solid state switch provided with an output means and a first and second input means, said output means coupled to the input of the plug-in spectrum analyzer, said first input means coupled to the output of the second wide-band amplifier, a second ultrasonic pulse generator, electronic triggering means connected to said first and second ultrasonic generators whereby said generators are synchronized, the output of said second ultrasonic pulse generator connected to said second input means whereby a gating pulse is applied to the solid state switch enabling the selection of a certain ultrasonic echo pulse pattern display for spectrum analysis, means for producing a stationary pattern display of the ultrasonic pulses transmitted to said specimen and the ultrasonic pulse echoes reflected by said specimen comprising, said electronic triggering means connected to external trigger input means of said dual-beam oscilloscope whereby the time base associated with the said one of said beams is synchronized with the first ultrasonic generator thereby producing a stationary pulse pattern display of ultrasonic pulses energizing said specimen and the ultrasonic pulses reflected by said specimen, and means for intensifying the pulse pattern and spectrum displays comprising, said second ultrasonic generator having the output thereof coupled to the intensity input means of said dual-beam oscilloscope whereby pulse intensity signals are applied thereto.

References Cited

UNITED STATES PATENTS 3,407,649   10/1968   Dickinson ---------- 73—67.5
3,453,871   7/1969    Krautkramer -------- 73—67.8

OTHER REFERENCES

Gericke, O. R., "Dual-Frequency Ultrasonic Pulse, Echo Testing," Jour. Acous. So. Am., February 1964, pp. 313–322.

Gericke, O. R., "Determination of the Geometry of Hidden Defects by Ultrasonic Pulse Analysis Techniques," Jour. Acous. So. Am., March 1963, pp. 364–368.

Forgacs, R. L., "Improvements in the Sinc-Around Technique for Ultrasonic Velocity Measurement," Jour. Acous. So. Am., December 1940, p. 1697.

RICHARD C. QUEISSER, Primary Examiner

A. E. KORKOSZ, Assistant Examiner